United States Patent
Etchegoyen

(10) Patent No.: US 9,082,128 B2
(45) Date of Patent: Jul. 14, 2015

(54) SYSTEM AND METHOD FOR TRACKING AND SCORING USER ACTIVITIES

(75) Inventor: Craig S. Etchegoyen, Irvine, CA (US)

(73) Assignee: Uniloc Luxembourg S.A., Luxembourg (LU)

( * ) Notice: Subject to any disclaimer, the term of this patent is extended or adjusted under 35 U.S.C. 154(b) by 587 days.

(21) Appl. No.: 12/903,959

(22) Filed: Oct. 13, 2010

(65) Prior Publication Data

US 2011/0093474 A1  Apr. 21, 2011

(51) Int. Cl.
*G06F 17/30* (2006.01)
*G06Q 30/02* (2012.01)

(52) U.S. Cl.
CPC ...................................... *G06Q 30/02* (2013.01)

(58) Field of Classification Search
USPC .......................................... 707/769; 705/319
See application file for complete search history.

(56) References Cited

U.S. PATENT DOCUMENTS

| | | | |
|---|---|---|---|
| 4,351,982 A | 9/1982 | Miller et al. | |
| 4,658,093 A | 4/1987 | Hellman | |
| 4,704,610 A | 11/1987 | Smith et al. | |
| 4,796,220 A | 1/1989 | Wolfe | |
| 5,210,795 A | 5/1993 | Lipner et al. | |
| 5,291,598 A | 3/1994 | Grundy | |
| 5,414,269 A | 5/1995 | Takahashi | |
| 5,418,854 A | 5/1995 | Kaufman et al. | |
| 5,440,635 A | 8/1995 | Bellovin et al. | |
| 5,490,216 A | 2/1996 | Richardson, III | |
| 5,615,061 A * | 3/1997 | Singh | 360/60 |
| 5,666,415 A | 9/1997 | Kaufman | |
| 5,745,879 A | 4/1998 | Wyman | |
| 5,754,763 A | 5/1998 | Bereiter | |
| 5,790,664 A | 8/1998 | Coley et al. | |
| 5,925,127 A | 7/1999 | Ahmad | |

(Continued)

FOREIGN PATENT DOCUMENTS

| | | |
|---|---|---|
| AU | 678985 | 6/1997 |
| EP | 1 637 958 | 3/2006 |

(Continued)

OTHER PUBLICATIONS

Kurchack, Notes application strategies: User activity tracking, Mar. 15, 2004.*

(Continued)

*Primary Examiner* — William Spieler
(74) *Attorney, Agent, or Firm* — Sean D. Burdick

(57) ABSTRACT

A system for tracking user activities on a computing network and generating a peer-group score based on those activities may be implemented in hardware and software that when executed performs steps for receiving at a server information including a device identifier, a user score associated with the device identifier, and content provider information from a content provider, the device identifier being based on one or more of user-configurable and non-user-configurable parameters of a user device used to access network-accessible content of the content provider, categorizing the content provider as belonging to one or more classes of service based on the received information, retrieving from a database one or more provider-generated user scores belonging to an identical one of the one or more classes of service and being associated with an identical device identifier, and generating a peer-group score for the received device identifier based on the received user score and the one or more retrieved provider-generated user scores.

17 Claims, 4 Drawing Sheets

(56) References Cited

U.S. PATENT DOCUMENTS

| | | |
|---|---|---|
| 5,974,150 A | 10/1999 | Kaish et al. |
| 6,009,401 A | 12/1999 | Horstmann |
| 6,044,471 A | 3/2000 | Colvin |
| 6,138,155 A | 10/2000 | Davis et al. |
| 6,158,005 A | 12/2000 | Bharathan et al. |
| 6,167,517 A | 12/2000 | Gilchrist et al. |
| 6,173,283 B1 | 1/2001 | Kasso et al. |
| 6,195,447 B1 | 2/2001 | Ross |
| 6,230,199 B1 | 5/2001 | Revashetti et al. |
| 6,233,567 B1 | 5/2001 | Cohen |
| 6,243,468 B1 | 6/2001 | Pearce et al. |
| 6,294,793 B1 | 9/2001 | Brunfeld et al. |
| 6,330,670 B1 | 12/2001 | England et al. |
| 6,449,645 B1 | 9/2002 | Nash |
| 6,536,005 B1 | 3/2003 | Augarten |
| 6,754,665 B1 | 6/2004 | Futagami et al. |
| 6,785,825 B2 | 8/2004 | Colvin |
| 6,859,793 B1 | 2/2005 | Lambiase |
| 6,920,567 B1 | 7/2005 | Doherty et al. |
| 6,976,009 B2 | 12/2005 | Tadayon et al. |
| 6,985,953 B1 | 1/2006 | Sandhu et al. |
| 6,993,580 B2 | 1/2006 | Isherwood et al. |
| 7,032,110 B1 | 4/2006 | Su et al. |
| 7,069,440 B2 | 6/2006 | Aull |
| 7,069,595 B2 | 6/2006 | Cogmigni et al. |
| 7,085,741 B2 | 8/2006 | Lao et al. |
| 7,188,241 B2 | 3/2007 | Cronce et al. |
| 7,203,966 B2 | 4/2007 | Abburi et al. |
| 7,206,765 B2 | 4/2007 | Gilliam et al. |
| 7,272,728 B2 | 9/2007 | Pierson et al. |
| 7,319,987 B1 | 1/2008 | Hoffman et al. |
| 7,327,280 B2 | 2/2008 | Bachelder et al. |
| 7,337,147 B2 | 2/2008 | Chen et al. |
| 7,343,297 B2 | 3/2008 | Bergler et al. |
| 7,463,945 B2 | 12/2008 | Kiesel et al. |
| 7,523,860 B2 | 4/2009 | Bonelle et al. |
| 7,590,852 B2 | 9/2009 | Hatter et al. |
| 7,653,899 B1 | 1/2010 | Lindahl et al. |
| 7,739,402 B2 | 6/2010 | Roese |
| 8,190,475 B1 | 5/2012 | Merrill |
| 8,255,948 B1 | 8/2012 | Black et al. |
| 8,326,001 B2 | 12/2012 | Free |
| 8,441,548 B1 | 5/2013 | Nechyba et al. |
| 8,483,450 B1 | 7/2013 | Derakhsani et al. |
| 8,635,087 B1 | 1/2014 | Igoe et al. |
| 2001/0034712 A1 | 10/2001 | Colvin |
| 2001/0044782 A1 | 11/2001 | Hughes et al. |
| 2001/0049620 A1 | 12/2001 | Blasko |
| 2002/0019814 A1 | 2/2002 | Ganesan |
| 2002/0082997 A1 | 6/2002 | Kobata et al. |
| 2002/0161718 A1 | 10/2002 | Coley et al. |
| 2003/0065918 A1 | 4/2003 | Wiley |
| 2003/0084306 A1 | 5/2003 | Abburi et al. |
| 2003/0163483 A1 | 8/2003 | Zingher et al. |
| 2003/0172035 A1 | 9/2003 | Cronce et al. |
| 2003/0190046 A1* | 10/2003 | Kamerman et al. ......... 380/286 |
| 2004/0024860 A1 | 2/2004 | Sato et al. |
| 2004/0030912 A1 | 2/2004 | Merkle et al. |
| 2004/0059929 A1 | 3/2004 | Rodgers et al. |
| 2004/0143746 A1 | 7/2004 | Ligeti et al. |
| 2004/0187018 A1 | 9/2004 | Owen et al. |
| 2004/0236649 A1 | 11/2004 | Yip et al. |
| 2005/0010780 A1 | 1/2005 | Kane et al. |
| 2005/0108173 A1 | 5/2005 | Stefik et al. |
| 2005/0138155 A1 | 6/2005 | Lewis |
| 2005/0172280 A1 | 8/2005 | Ziegler et al. |
| 2005/0187890 A1 | 8/2005 | Sullivan |
| 2005/0278542 A1 | 12/2005 | Pierson et al. |
| 2006/0072444 A1 | 4/2006 | Engle et al. |
| 2006/0080534 A1 | 4/2006 | Yeap et al. |
| 2006/0095454 A1 | 5/2006 | Shankar et al. |
| 2006/0123101 A1 | 6/2006 | Buccella et al. |
| 2006/0161914 A1 | 7/2006 | Morrison et al. |
| 2006/0265337 A1 | 11/2006 | Wesinger, Jr. |
| 2006/0282660 A1 | 12/2006 | Varghese et al. |
| 2007/0050638 A1 | 3/2007 | Rasti |
| 2007/0113090 A1 | 5/2007 | Villela |
| 2007/0168288 A1 | 7/2007 | Bozeman |
| 2007/0198422 A1 | 8/2007 | Prahlad et al. |
| 2007/0203846 A1 | 8/2007 | Kavuri et al. |
| 2007/0214133 A1* | 9/2007 | Liberty et al. ............. 707/5 |
| 2007/0219917 A1 | 9/2007 | Liu et al. |
| 2007/0234409 A1 | 10/2007 | Eisen |
| 2007/0239606 A1 | 10/2007 | Eisen |
| 2007/0282615 A1 | 12/2007 | Hamilton et al. |
| 2007/0294403 A1 | 12/2007 | Verona |
| 2008/0027858 A1 | 1/2008 | Benson |
| 2008/0028455 A1 | 1/2008 | Hatter et al. |
| 2008/0040802 A1 | 2/2008 | Pierson et al. |
| 2008/0065552 A1 | 3/2008 | Elezar et al. |
| 2008/0086423 A1 | 4/2008 | Waites |
| 2008/0092058 A1* | 4/2008 | Afergan et al. ............. 715/745 |
| 2008/0109491 A1 | 5/2008 | Gupta |
| 2008/0120195 A1 | 5/2008 | Shakkarwar |
| 2008/0147556 A1 | 6/2008 | Smith et al. |
| 2008/0212846 A1 | 9/2008 | Yamamoto et al. |
| 2008/0228578 A1 | 9/2008 | Mashinsky |
| 2008/0235375 A1 | 9/2008 | Reynolds et al. |
| 2008/0242279 A1 | 10/2008 | Ramer et al. |
| 2008/0320607 A1 | 12/2008 | Richardson |
| 2009/0083730 A1 | 3/2009 | Richardson |
| 2009/0089869 A1 | 4/2009 | Varghese |
| 2009/0138975 A1 | 5/2009 | Richardson |
| 2009/0150330 A1 | 6/2009 | Gobeyn |
| 2009/0150674 A1 | 6/2009 | Richardson et al. |
| 2009/0254476 A1 | 10/2009 | Sharma et al. |
| 2009/0292743 A1 | 11/2009 | Bigus et al. |
| 2009/0320096 A1 | 12/2009 | Nolan et al. |
| 2010/0125911 A1* | 5/2010 | Bhaskaran ................. 726/23 |
| 2010/0185871 A1 | 7/2010 | Scherrer et al. |
| 2010/0235241 A1 | 9/2010 | Wang et al. |
| 2010/0305989 A1 | 12/2010 | Mu et al. |
| 2010/0325710 A1* | 12/2010 | Etchegoyen ............... 726/7 |
| 2011/0040825 A1 | 2/2011 | Ramzan et al. |
| 2011/0302003 A1 | 12/2011 | Shirish et al. |
| 2012/0030771 A1 | 2/2012 | Pierson et al. |

FOREIGN PATENT DOCUMENTS

| | | |
|---|---|---|
| EP | 1 637 961 | 3/2006 |
| EP | 1 670 188 | 6/2006 |
| EP | 1 912 413 | 4/2008 |
| WO | WO 92/20022 | 11/1992 |
| WO | WO 93/01550 | 1/1993 |
| WO | WO 95/35533 | 12/1995 |
| WO | WO 00/67095 | 11/2000 |
| WO | WO 2005/104686 | 11/2005 |
| WO | WO 2007/060516 | 5/2007 |
| WO | WO 2008/013504 | 1/2008 |
| WO | WO 2008/157639 | 12/2008 |
| WO | WO 2009/039504 | 3/2009 |
| WO | WO 2009/065135 | 5/2009 |
| WO | WO 2009/076232 | 6/2009 |
| WO | WO 2009/105702 | 8/2009 |
| WO | WO 2009/143115 | 11/2009 |
| WO | WO 2009/158525 | 12/2009 |
| WO | WO 2010/093683 | 8/2010 |
| WO | WO 2010/104928 | 9/2010 |

OTHER PUBLICATIONS

Mint.com, Mint.com website. Also, search Mint.com on the Wayback Machine—Prior Art Detail.*

Keane et al., Transistor Aging, Apr. 25, 2011.*

Vamosi, Device Fingerprinting Aims to Stop Online Fraud, Mar. 10, 2009.*

Gassend et al,., Silicon Physical Unknown Functions and Secure Smartcards, May 2002.*

"Technical Details on Microsoft Product Activation for Windows XP," Internet Citation, XP002398930, Aug. 13, 2001.

Angha et al.; "Securing Transportation Network Infrastructure with Patented Technology of Device Locking—Developed by Uniloc USA", http://www.dkassociates.com/admin/paperfile/

(56) References Cited

OTHER PUBLICATIONS

ITS%20World%20Paper%20Submission_Uniloc%20_2_.pdf; Oct. 24, 2006.
Econolite; Econolite and Uniloc Partner to Bring Unmatched Infrastructure Security to Advanced Traffic Control Networks with Launch to StrongPoint; http://www.econolite.com/docs/press/20080304_Econolite_StronPoint.pdf; Mar. 4, 2008.
Johnson et al. "Dimensions of Online Behavior: Toward a User Typology," *Cyberpsycology and Behavior*, vol. 10, No. 6, pp. 773-779, 2007. XP002317349.
Klein, M., "How to Use a Loyalty Analysis," *Loyalty Builders*, pp. 1-6, 2003. XP002617371.
Lee P, "Oracle Adaptive Access Manager Reference Guide, Release 10g (10.1.4.5)," May 2009, Internet Article retrieved on Sep. 27, 2010. XP002603489.
Wikipedia: "Device Fingerprint," May 5, 2009, modified on Jan. 20, 2011, Internet Article retrieved on Apr. 19, 2011.
Williams et al., "Web Database Applications with PHP & MySQL," *O'Reilly Media Chapter 1. Database Applications and the Web* Mar. 2002, Internet Article retrieved on Sep. 21, 2010. XP002603488.
Williams, R., "A Painless Guide to CRC Error Detection Algorithms," Aug. 13, 1993, 33 pages, www.ross.net/crc/download/crc_v3.txt.
Wikipedia: "Software Extension," May 28, 2009, Internet Article retrieved on Oct. 11, 2010. XP002604710.
"How it Works?" Article downloaded from www.mint.com on Mar. 31, 2011 with a publication date of Sep. 14, 2007, 6 pages.
://www.ibm.com/developerworks/lotus/library/appstrat- usertrack/index.
Gupta et al., "Efficient Fingerprint-based User Authentication for Embedded Systems," Proceedings of the 42nd Annual Design Automation Conference, New York City, New York, 2005.
"German Stores Put Money at Your Fingertips", Independent Online, Sep. 4, 2007.
"Lowes Foods Brings Biometric Payments and Check Cashing to Its Customers," Banking & Financial Solutions, Bioguard Components & Technologies Ltd, Feb. 7, 2005.
"Pay by Touch," From Wikipedia, Feb. 22, 2011, 2 pages.
Agbinya et al., "Development of Digital Environment Identity (DEITY) System for On-line Access," Third International Conference on Broadband Communications, Information Technology & Biomedical Applications, Third International Conference on IEEE, Piscataway, New Jersey, Nov. 23, 2008, 8 pages. XP031368250.
Lemos, Robert, "Fingerprint Payments Taking Off Despite Security Concerns," *Security Focus*, Oct. 10, 2007, 3 pages.
Sim et al. "Continous Verification Using Multimodal Biometrics", *IEEE Transactions on Pattern Analysis and Machine Intelligence*, vol. 29, No. 4, Apr. 1, 2007, IEEE Serivce Center, Los Alamitos, CA, pp. 687-700. XP011168507.
Lee et al., "Analogous Content Selection Mechanism Using Device Profile and Content Profile for U-Learning Environments," 2009 Ninth IEEE International Conference on Advanced Learning Technologies, IEEE Computer Society.
Fraga, David, "Information Technology, Regime Stability and Democratic Meaningfulness: A Normative Evaluation of Present and Potential Trends," Honor's Thesis for a Degree for College Undergraduate Research, University of Pennsylvania, Mar. 30, 2007, 73 pages.
Soto, Lucy, "Not-so-Private Web: Information Leaks on Social Networks Can Leave Users Vulnerable," The Atlanta Journal-Constitution, Feb. 14, 2010, 3 pages.
Transcript from CBS Corp New, UBS Global Media Conference on Dec. 3, 2007 with Dave Poltrack by Matt Coppett, 9 pages.
Lazanu et al., Modelling spatial distribution of defects and estimation of electrical degradation of silicon detectors in radiation fields at high luminosity, Oct. 10, 2006, 5 pages.
Clarke et al. "Secure Hardware Processors Using Silicon One-Way Functions," MIT Laboratory for Computer Science, Mar. 2002, p. 141.
Keane et al. "Transistor Aging," IEEE Spectrum, Apr. 25, 2011.

\* cited by examiner

SYSTEM AND METHOD FOR TRACKING AND SCORING USER ACTIVITIES

This application claims priority to U.S. Provisional Application No. 61/252,977 which was filed Oct. 19, 2009 and which is fully incorporated herein by reference.

BACKGROUND

1. Field of the Invention

The present invention is directed toward a method and system for tracking and scoring a user based on behaviors of the user on a web site.

2. Description of the Related Art

Several techniques can be used to track a user's or a computer's activities on the Internet, such as tracking browser cookies, internet protocol (IP) addresses, and information embedded in the uniform resource locator (URL) address. IP address tracking is a common method used to track a user's activities and has been around since the inception of the Internet. However, tracking using IP address can be unreliable due to the today's extensive use of proxy server, firewall, and network layout that shares IP addresses among a plurality of computers. For example, certain Internet service provider (ISP) routes all Internet traffic through a proxy server or randomly assigns an IP address to a computer each time the computer logs onto the ISP server. A firewall or proxy server may also mask many client computers on its network as a single IP address. In these cases, tracking a device using IP address becomes entirely unreliable.

Tracking by storing a user's web browser cookies is also common, but this technique is also becoming undesirable and unreliable. Generally, cookies are saved as text strings on the user's local drive and are sent to web servers for session tracking. However, cookies files are often identified as a source for spyware data thus they are often deleted by anti-spyware and anti-virus applications. Further, current Internet web browser applications now give users the option to turn off the cookies. Because of this, using cookies to track a device is both unreliable and undesirable.

A server may also track a user using information embedded in a URL string. This process is implemented by appending a tracking or query string onto the URL string at the server prior to sending the URL string to a browser. When a web browser accesses the content using the URL embedded with tracking information, it sends the URL string back to the server. By keeping track of the embedded information, the server may track user activities. However, this method is prone to hacking and generating unreliable information because the tracking-information-embedded URL can be forwarded to other users via emails, postings, etc. Thus, when other computers or devices use the same URL link, the server will not be able to differentiate between each of those devices. Accordingly, it would be desirable to provide a technique for monitoring a device's activities on a content provider's web site.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with a method for tracking and scoring a device by peer-group or other aspect. In any scoring scheme, the first requirement is to have the ability to track a user or a device reliably. In one embodiment, to track a device, the content provider (e.g., a web server) may require the user install a standalone tracking client or module on the device. Alternatively, the tracking client may also be an applet application or a software plug-in of another software application, such as, for example, a web browser. The tracking client may be configured to generate a digital fingerprint for the device using the environmental information collected by the tracking client. Alternatively, the first boot fingerprint may be generated using specific components of the device as predetermined by the tracking client. The specific components may include components from a typical-upgrade components list or a non-typical-upgrade components list. The typical-upgrade components list may include components such as: graphic card, random access memory, sound card, network adaptor, hard drive, CD/DVD drive, Ethernet controller, or other routinely upgraded components. The non-typical-upgrade components list may include components such as: motherboard, USB host controller, central microprocessor, PCI Bus, System CMOS Clock, etc.

Once a unique digital fingerprint for the device is generated, it may be stored and tracked to generate a score for the device/user based on activities of the device. Content providers may track and record the digital fingerprint of a device every time the user of the device takes some action, such as accessing another page, clicking on a button, or downloading a picture on the website provided by the content provider, etc. The content provider may assign a score or point for each type of activity taken by the device. Certain types of activity will have different scores than other types of activity. For example, if the device purchases a song, the device may receive one hundred points, but may receive only five points for downloading a sample audio clip of the song.

When a device's session ends, the content provider may tally the points and associate the total points with the device's unique digital fingerprint or identifier. The points and the digital fingerprint for the device are then sent to a rating server that archives and analyzes the received data. The content provider may also send the rating server information regarding the content provider, such as web address, services provided, traffic information, etc.

The rating server may classify the content provider into one or more categories of provider type, such as: dating, shopping, social networking, news, online video streaming, gaming, etc. Once a class or category is assigned to the content provider, the rating server archives the received points and the digital fingerprint of the device along with the category of the content provider. In this way, a relational database of device points, device digital fingerprint, and the category of the content provider is established. For example, a single device may have points for different content providers in the same category, such as online news, in which case points are assigned to the device receiving content from CNN, CBSnews, Foxnews, etc.

To generate a peer-group score for a device or user, the rating server may query the database for the digital fingerprint of the device and retrieve all of the associated points and category of content provider data. A peer-group score is generated by performing a mathematical function on all points received from the query for a particular category and digital fingerprint. For example, a device having a digital fingerprint of xyz may have points submitted to the rating server by Ebay™, Bestbuy™, and Amazon™. Thus, the peer-group score for the xyz device may be an average of all the points. Alternatively, the peer-group score may be an average, median, maximum, or minimum over a certain time period.

In accordance with one or more embodiments and corresponding disclosure thereof, various aspects are described in connection with a method for generating a peer-group score of a device, the method comprising: receiving at a server information including a device identifier, a user score associated with the device identifier, and content provider information from a content provider, the device identifier being based on one or more of user-configurable and non-user-configurable parameters of a user device used to access network-accessible content of the content provider, categorizing the content provider as belonging to one or more classes of service based on the received information, retrieving from a database one or more provider-generated user scores belonging to one of the one or more classes of service and having the same device identifier, and generating a peer-group score for the received device identifier based on the received user score and the one or more retrieved provider-generated user scores.

In the foregoing method, the user score may be generated based on interactions between the user and the network-accessible content of the content provider. For example, a user may be scored based on how many pages were viewed, items purchased, message posted, active time spent on the site, etc. Each content provide may also be classified as a site relating to shopping, social networking, gaming, news, sports, and online video service, etc.

The peer-group score may be generated by averaging two or more of received user scores and provider-rated user scores. The non-user-configurable parameter may be based on a silicon degradation characteristic of a computer chip of the device. The user-configurable parameter may comprise at least one of hard disk volume name, user name, device name, user password, and hard disk initialization date for the device. Additionally, the device identifier may be generated using at least one irreversible transformation of the at least one user-configurable parameter and the at least one non-user configurable parameter of the device.

In accordance with yet another embodiment of the present invention, a computer readable medium is provided. The computer readable medium may have stored thereon, computer executable instructions that, when executed by a device, cause the device to perform a method comprising: receiving at server a device identifier, a user score associated with the device identifier, and content provider information from a content provider, the device identifier being based on one or more of user-configurable and non-user-configurable parameters of a user device used to access network-accessible content of the content provider, categorizing the content provider as belonging to one or more classes of service based on the received information, retrieving from a database one or more provider-generated user scores belonging to an identical class of servicer from the one or more classes of service and having the same device identifier, and generating a peer-group score for the received device identifier based on the received user score and the one or more retrieved provider-generated user scores.

In accordance with yet another embodiment of the present invention, a system for generating a peer-group score is provided. The system comprising: a server configured to receiver a device identifier, a user score associated with the device identifier, and content provider information from a content provider, the device identifier being based on one or more of user-configurable and non-user-configurable parameters of a user device used to access network-accessible content of the content provider; a data analyzer coupled to the server, the data analyzer configured to categorize the content provider as belonging to one or more classes of service based on the received information; a database manager coupled to the server, the database manager configured to retrieve one or more provider-generated user scores belonging to an identical class of service and having identical device identifier; and a statistic engine coupled to the server, the statistic engine generator to generate a peer-group score for the received device identifier based on the received user score and the one or more retrieved provider-generated user scores.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention.

DETAILED DESCRIPTION

Figure 1:
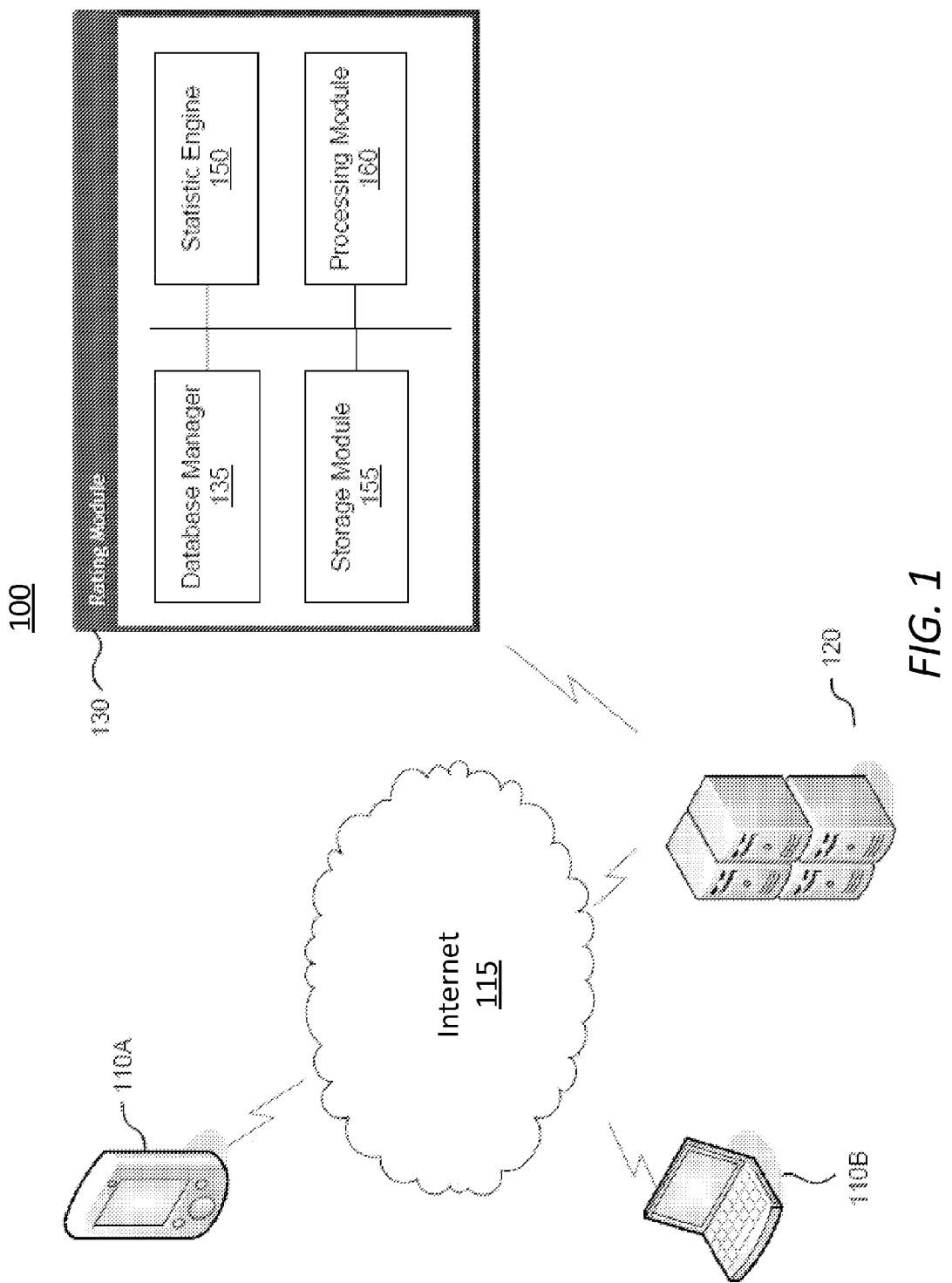
FIG. 1 is a block diagram illustrating an exemplary environment within which a method for tracking and scoring user activities may be implemented according to one embodiment of the present invention.

Reliable tracking data of a user or a device are valuable for marketing and consumer studies. With reliable tracking data, a merchant may tailor a content of a website specific to the user's interest and past behaviors. However, current tracking systems are unreliable for reasons discussed above. Accordingly, there is a need for a reliable tracking and peer-group scoring system. A high-level description of the tracking and peer-group rating method and system are described below. According to one embodiment of the present invention, a rating server is configured to provide information on a user/device, such as a peer-group score, interest indicator of the user, and a classification service type provided by the content provider. Content providers that subscribe to the rating server may receive the above market and consumer information and, in response, may tailor the content of their websites in real-time to match the interest and behavior of the user. For example, a content provider may recognize a sport enthusiast whom frequently purchases football related goods through information received from a rating server, and in response displays advertisement relating to football, such as clothing and/or games. Using the information received from the rating server, content providers may also suggest products and/or services to the user, for example.

As previously mentioned, in any tracking scheme, the first requirement is to have the ability to track a user reliably. In one embodiment, the content provider may require the user install a standalone tracking client or module on the device. The tracking client may also be installed as an applet application or a software plug-in of another software application, such as, for example, a web browser. The tracking client may be configured to generate a unique digital fingerprint for the device using information collected by the tracking client.

The unique digital fingerprint may be stored and tracked to generate a score for the device/user based on activities of the device. Using the digital fingerprint, content providers may reliably track a device as it navigates through the network-accessible contents on each provider's website. Each content provider may define its own scoring rule. Various scores/points can be awarded for actions, such as accessing a certain page, clicking on a button, or downloading a picture on the website provided by the content provider, purchasing an item, etc. Certain type of activity will have more score than other. For example, if the device purchases a song, the device may receive 100 points, but may receive only 5 points for downloading a sample audio clip of the song.

The tracking client may calculate the total points for a device and send it to a rating server along with the digital fingerprint of the device. The tracking client may also send the rating server information such as, such as web address, category of services provided by the content provider, network traffic information, a user interest indicator, etc.

In one embodiment, the rating server may classify the content provider into one or more categories of provider type, such as: dating, shopping, social networking, news, online video streaming, gaming, etc. Once a class or category is assigned to the content provider, the rating server archives the received points and the digital fingerprint of the device along with the category of the content provider.

To generate a peer-group score for a device or user, the rating server may query the database for the digital fingerprint of the device and retrieve all of the associated points and category of content provider data. A peer-group score is generated by performing a mathematical function on all points received from the query for a particular category and digital fingerprint. For example, a device having a digital fingerprint of xyz may have points submitted to the rating server by Ebay®, Bestbuy®, and Amazon®. Thus, the peer-group score for the xyz device may be an average of all the points. Alternatively, the peer-group score may be an average, median, maximum, or minimum over a certain time period.

Before describing the invention in further detail, it is useful to describe an example environment with which the invention can be implemented. FIG. 1 is a diagram illustrating an example environment 100 with which the online commerce restriction, system, and apparatus is implemented according to one or more embodiments of the present invention. The illustrated example environment 100 includes devices 110a and 110b, a network 115, a rating server 120, and a software/hardware module 130. Devices 110 may include a tracking client (not shown) configured to authenticate the device to an tracking server as generally described above. The tracking client may comprise a stand-alone application or an applet running within a web browser on the device 110 (e.g., an applet comprising executable code for a Java Virtual Machine). The tracking client may be embedded in or associated with another software application, including but not limited to a web browser. For example, the tracking client may be embedded in or associated with a tool bar of a software application, such as, for example, a web browser. The tracking client may prompt the user to register with an online software registration service, or may run in the background with little or no interaction with the user of device 110. The tracking client may also be digitally distributed or streamed from one or more servers. Network 115 may comprise the Internet, a local area network, or other form of communication network.

Referring again to FIG. 1, computing devices 110a-b may be in operative communication with rating server 120. While only one computing device 110 is illustrated, it will be understood that a given system may comprise any number of computing devices. Computing device 110 may be, but is not limited to, a mobile phone, netbook, a mobile game console, mobile computing device, a tablet computer, a personal digital assistant, a wireless communication device, an onboard vehicle computer, or any other device capable of communication with a computer network.

The tracking client may be configured to collect a number of parameters which are expected to be unique to a computing device environment. The parameters collected may include, for example, hard disk volume name, user name, device name, user password, hard disk initialization date, etc. The collected information may include information that identifies the hardware comprising the platform on which the web browser runs, such as, for example, CPU number, or other parameters associated with the firmware in use. The system information may further include system configuration information, such as amount of memory, type of processor, software or operating system serial number, etc.

The device identifier 224 may be generated and stored in a hidden directory of the device 110 and/or at a remote location, such as the server 120. The device identifier 224 may incorporate the device's IP address and/or other geo-location code to add another layer of specificity to device's unique identifier.

It is noted that the tracking client running on the computing device or otherwise having access to the computing device's hardware and file system may generate a unique device identifier (e.g., device identifier 224) using a process that operates on data indicative of the computing device's configuration and hardware. The device identifier may be generated using a combination of user-configurable and non-user-configurable machine parameters as input to a process that results in the device identifier, which may be expressed in digital data as a binary number. Each machine parameter is data determined by a hardware component, software component, or data component specific to the device that the unique identifier pertains to. Machine parameters may be selected based on the target device system configuration such that the resulting device identifier has a very high probability (e.g., greater than 99.999%) of being unique to the target device. In addition, the machine parameters may be selected such that the device identifier includes at least a stable unique portion up to and including the entire identifier, that has a very high probability of remaining unchanged during normal operation of the target device. Thus, the resulting device identifier should be highly specific, unique, reproducible and stable as a result of properly selecting the machine parameters. Once the device identifier is generated, a response code is produced using specific portions of the device identifier as requested by the request code.

The application for generating the device identifier may also operate on the collected parameters with one or more algorithms to generate the device identifier. This process may include at least one irreversible transformation, such as, for example, a cryptographic hash function, such that the input machine parameters cannot be derived from the resulting device identifier. Each device identifier, to a very high degree of certainty, cannot be generated except by the suitably configured application operating or otherwise having had access to the same computing device for which the device identifier was first generated. Conversely, each identifier, again to a very high degree of certainty, can be successfully reproduced by the suitably configured application operating or otherwise having access to the same computing device on which the identifier was first generated.

The application may operate by performing a system scan to determine a present configuration of the computing device. The application may then select the machine parameters to be used as input for generating the unique device identifier. Selection of parameters may vary depending on the system configuration. Once the parameters are selected, the application may generate the identifier.

Further, generating the device identifier may also be described as generating a device fingerprint and may entail the sampling of physical, non-user configurable properties as well as a variety of additional parameters such as uniquely generated hashes and time sensitive values. Physical device parameters available for sampling may include, for example, unique manufacturer characteristics, carbon and silicon degradation and small device failures.

The process of measuring carbon and silicon degradation may be accomplished by measuring a chip's ability to process complex mathematical computations, and its ability to respond to intensive time variable computations. These processes measure how fast electricity travels through the carbon. Using variable offsets to compensate for factors such as heat and additional stresses placed on a chip during the sampling process allows for each and every benchmark to reproduce the expected values. During a standard operating lifetime, the process of passing electricity through the various switches causes a computer chip to degrade. These degradations manifest as gradually slower speeds that extend the processing time required to compute various benchmarking algorithms.

In addition to the chip benchmarking and degradation measurements, the process for generating a device identifier may include measuring physical, non-user-configurable characteristics of disk drives and solid state memory devices. Each data storage device has a large variety of damage and unusable data sectors that are nearly unique to each physical unit. The ability to measure and compare values for damaged sectors and data storage failures provides a method for identifying storage devices.

Device parameter sampling, damage measurement and chip benchmarking make up just a part of device fingerprinting technologies described herein. These tools may be further extended by the use of complex encryption algorithms to convolute the device identifier values during transmission and comparisons. Such encryption processes may be used in conjunction with random sampling and key generations.

The device identifier may be generated by utilizing machine parameters associated with one or more of the following: machine model; machine serial number; machine copyright; machine ROM version; machine bus speed; machine details; machine manufacturer; machine ROM release date; machine ROM size; machine UUID; and machine service tag.

The device identifier may also be generated by utilizing machine parameters associated with one or more of the following: CPU ID; CPU model; CPU details; CPU actual speed; CPU family; CPU manufacturer; CPU voltage; and CPU external clock.

The device identifier may also be generated by utilizing machine parameters associated with one or more of the following: memory model; memory slots; memory total; and memory details.

The device identifier may also be generated by utilizing machine parameters associated with one or more of the following: video model; video details; display model; display details; audio model; and audio details.

The device identifier may also be generated by utilizing machine parameters associated with one or more of the following: network model; network address; Bluetooth address; Blackbox model; Blackbox serial; Blackbox details; Blackbox damage map; Blackbox volume name; NetStore details; and NetStore volume name.

The device identifier may also be generated by utilizing machine parameters associated with one or more of the following: optical model; optical serial; optical details; keyboard model; keyboard details; mouse model; mouse details; printer details; and scanner details.

The device identifier may also be generated by utilizing machine parameters associated with one or more of the following: baseboard manufacturer; baseboard product name; baseboard version; baseboard serial number; and baseboard asset tag.

The device identifier may also be generated by utilizing machine parameters associated with one or more of the following: chassis manufacturer; chassis type; chassis version; and chassis serial number.

The device identifier may also be generated by utilizing machine parameters associated with one or more of the following: IDE controller; SATA controller; RAID controller; and SCSI controller.

The device identifier may also be generated by utilizing machine parameters associated with one or more of the following: port connector designator; port connector type; port connector port type; and system slot type.

The device identifier may also be generated by utilizing machine parameters associated with one or more of the following: cache level; cache size; cache max size; cache SRAM type; and cache error correction type.

The device identifier may also be generated by utilizing machine parameters associated with one or more of the following: fan; PCMCIA; modem; portable battery; tape drive; USB controller; and USB hub.

The device identifier may also be generated by utilizing machine parameters associated with one or more of the following: device model; device model IMEI; device model IMSI; and device model LCD.

The device identifier may also be generated by utilizing machine parameters associated with one or more of the following: wireless 802.11; webcam; game controller; silicon serial; and PCI controller.

Figure 2:
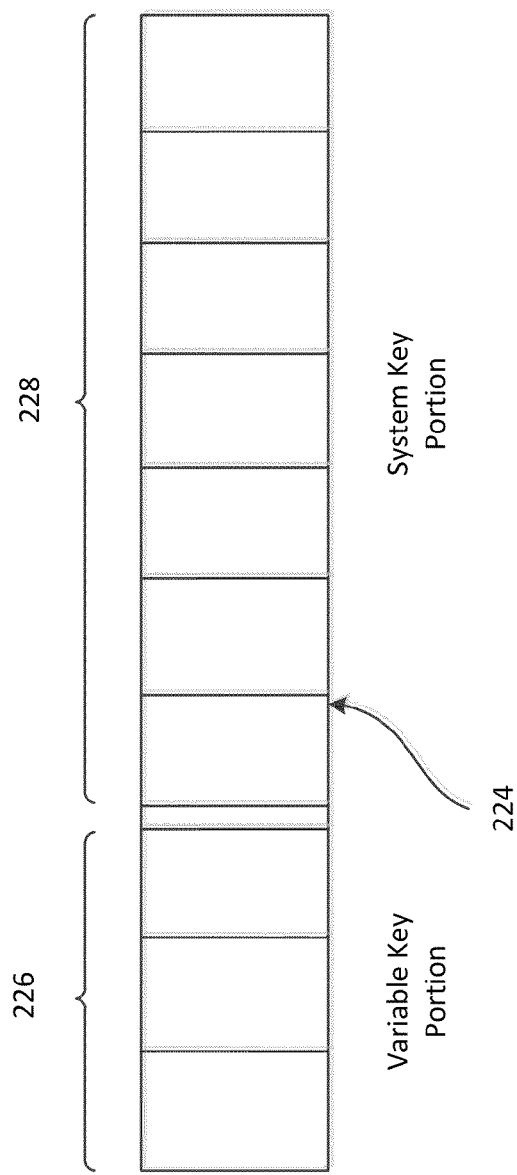
FIG. 2 is a block diagram representing one example of memory allocation in a device identifier for use with various embodiments of the present invention.

With reference to FIG. 2, in one embodiment, the device identifier 224 may include two components—namely, a variable key portion 226 and a system key portion 228. The variable key portion 226 may be generated at the time of registration of computing device 110 by reference to a variable platform parameter, such as via reference to system time information, although other parameters which are variable may be utilized in other embodiments. The system key portion 228 may include the above described parameters expected to be unique to the device 110, such as, for example, hard disk volume name, user name, computer name, user password, hard disk initialization date, or combinations thereof. Portions 226 and/or 228 may be combined with the IP address and/or other platform parameters of the device 110. It is noted that device identifiers, or portions thereof, may be encrypted to add an additional layer of specificity and security.

Referring again to FIG. 1, rating server 120 may comprise a hardware/software rating module 130, which may include a database manager 135, an statistic module 150, a storage module 155, and a processing module 160. Database manager 135 may be configured to track and archive device identifier 224 received from the tracking client on computing device 110.

The tracking client may electronically send device identifier 224, network traffic information, and user interest indicator to rating server 120. The rating server 120 may encrypt and store the data, such as the device identifier 224 and other data received from the computing device 110. Rating server 120 may also receive such data from a plurality of computing devices and store the received data in storage module 155.

In one embodiment, the statistic engine 150 may generate a peer-group score using data associated with device identifier 224 such as a points provided by a content provider, a user interest indicator, and the category of the content provider. The peer-group score may be generated by querying storage module 155 for the digital fingerprint of the device and retrieve all of the associated points and category of content provider data. A peer-group score is then generated by performing a mathematical function on all points received from the query for a particular category and digital fingerprint. In one embodiment, a peer-group score is generated using user interest indicators and all points received from the query for a particular category and digital fingerprint.

Figure 3:
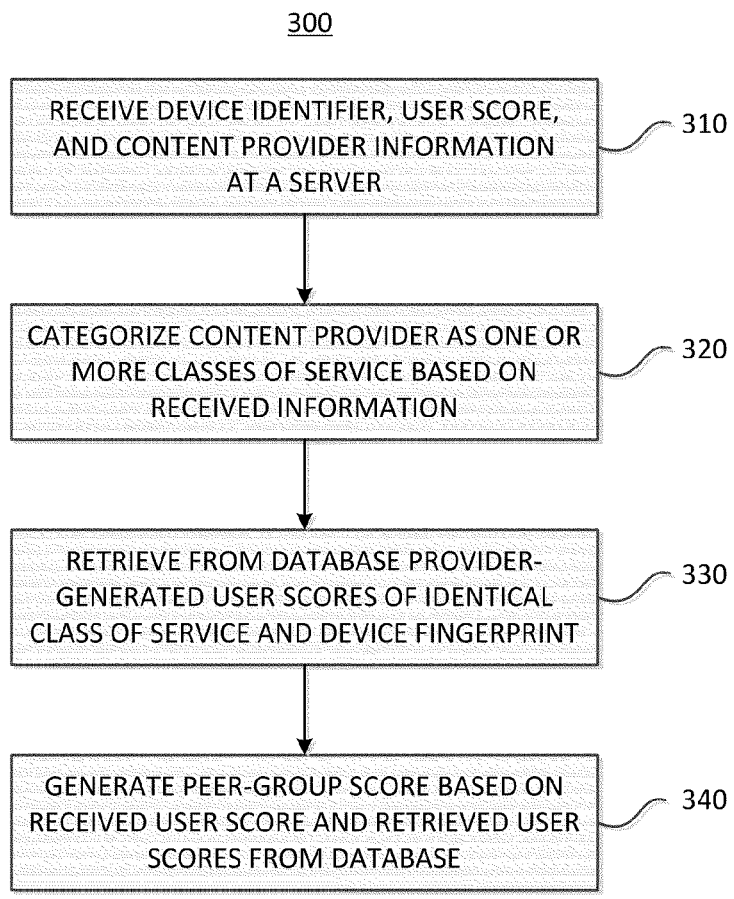
FIG. 3 is a process flow chart illustrating one embodiment of a method according to the invention for generating a peer-group score for a user.
Figure 4:
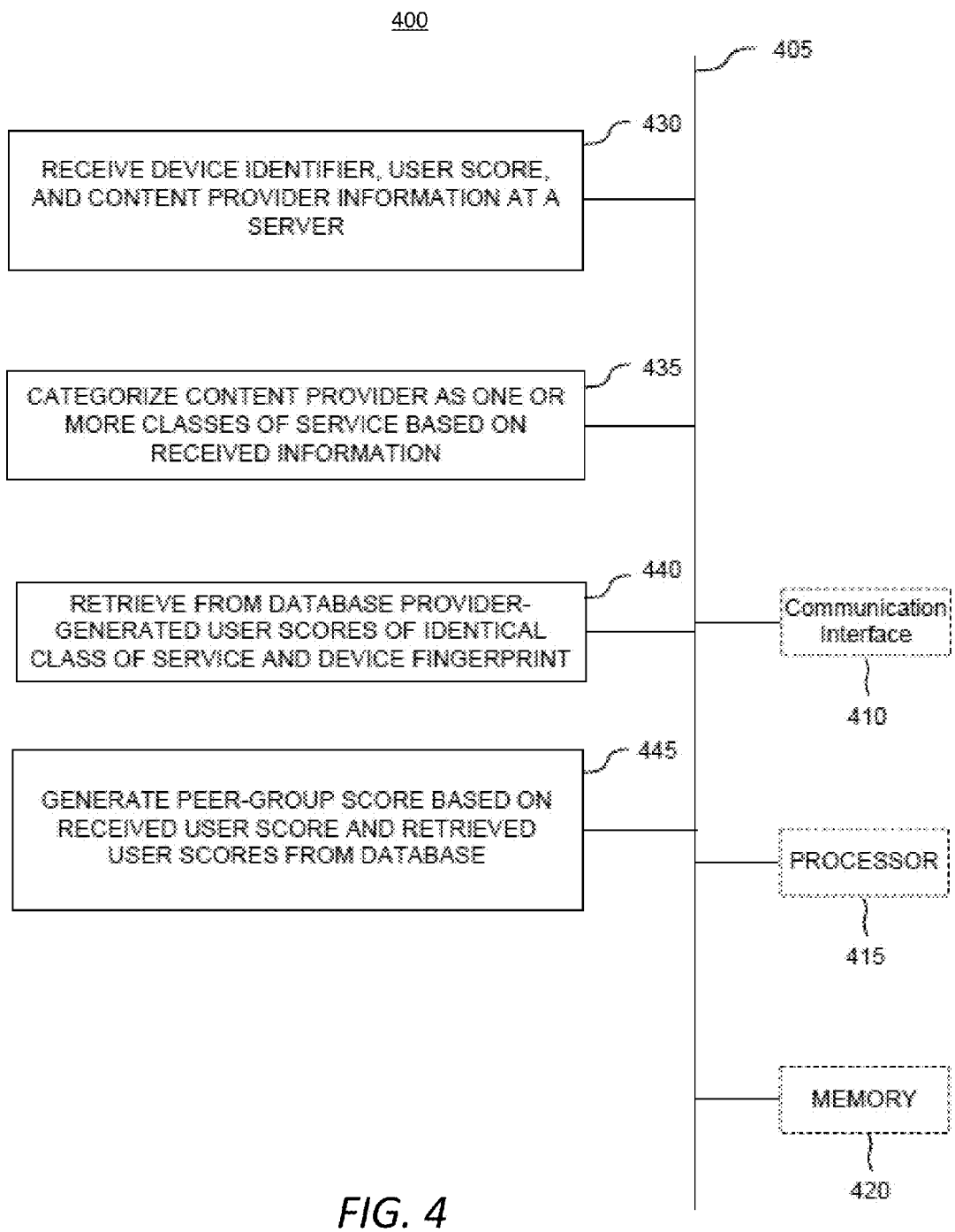
FIG. 4 is a block diagram illustrating an exemplary computing system with which software components can be executed to perform the method for generating a peer-group score for a user according to one embodiment of the present invention.

FIG. 3 illustrates an example process flow of a method 300 for authenticating a device, on the rating server side, according to one embodiment of the present invention. Referring now to FIG. 3, method 300 starts at step 310 where a digital fingerprint of a device, a user's score, and miscellaneous information are received by the rating server. The miscellaneous information received may include, for example, web address of the content provider, network traffic information, and a user interest indicator. The user interest indicator may include information to help the rating server identify what type of services and activities the user is interested in. The interest indicator is generated by the tracking client on the device. The interest indicator may be based on the type of information the user frequently accessed or items frequently purchased, for example.

In step 320, the content provider is categorized as belonging to one or more class or type of services, such as, for example, games, news, networking, dating, etc. Step 320 may be implemented by a data analyzer of the rating server. In step 330, user scores submitted by other content providers having identical device fingerprint are retrieved from the database. Data regarding the category of service the content provider belongs to are also retrieved. In one embodiment, step 330 may be implemented by a database manager or SQL engine. Once the use scores are retrieved, the rating server may generate a separate score for each different category of service. For example, each digital fingerprint may have scores submitted by various categories of business, such as, for example, Amazon®, CNN®, and eHarmony®. Thus, the database manager may retrieve three different scores from each of Amazon®, eBay®, CNN®, Wikipedia®, Match®, and eHarmony®. In one embodiment, the data analyzer of step 320 may categorize Amazon® and eBay® under a shopping category, CNN® and Wikipedia® under a news and knowledge category, and Match® and eHarmony® under a dating category.

In step 340, a peer-group score is generated based on the scores and information retrieved at step 330. For example, a peer-group score for the shopping category may be generated. The peer-group score can be an average of all scores in the same category. Alternatively, the peer-group scour can be an average of scores of a combination of different categories. It should be noted that other statistical tools can be used to generate the peer-group score such as the median of all collected scores. Alternatively, the scores can be generated for a certain date range, etc.

In accordance with one or more embodiments of the present invention, there are provided devices and apparatuses for authenticating a device. With reference to FIG. 5, there is provided an exemplary apparatus 500 that may be configured as either a computing device, or as a processor or similar device for use within a computing device. As illustrated, apparatus 500 may include: means for receiving at server a device identifier, a user score associated with the device identifier, and content provider information from a content provider, the device identifier being based on one or more of user-configurable and non-user-configurable parameters of a user device used to access network-accessible content of the content provider; means for categorizing the content provider as belonging to one or more classes of service based on the received information; means for retrieving from a database one or more provider-generated user scores belonging to an identical class of service and having identical device identifier; and means for generating a peer-group score for the received device identifier based on the received user score and the one or more retrieved provider-generated user scores.

It is noted that apparatus 400 may include a communications interface 410. Communications interface 410 allows software and data to be transferred between apparatus 400 and external devices. Examples of communications interface 410 may include a modem, a network interface (such as an Ethernet card), a communications port, a PCMCIA slot and card, or the like. Software and data transferred via communications interface 410 are in the form of signals which may be electronic, electromagnetic, optical, or other signals capable of being received by communications interface 410. These signals may be provided to communications interface 410 via a communications path, which may carry signals and may be implemented using wire or cable, fiber optics, a phone line, a cellular phone link, an RF link and other communications channels.

Apparatus 400 may also include processor module 415 having at least one processor, in the case of apparatus 400 configured as computing device, rather than as a processor. Processor 415, in such case, may be in operative communication with means 430-445, and components thereof, via a bus 405 or similar communication coupling. Processor 415 may effect initiation and scheduling of the processes or functions performed by means 430-445, and components thereof.

In further related aspects, apparatus 400 may optionally include a means for storing information, such as, for example, a memory device/module 420. Computer readable medium or memory device/module 420 may be operatively coupled to the other components of apparatus 400 via bus 405 or the like. The computer readable medium or memory device 420 may be adapted to store computer readable instructions and data for effecting the processes and behavior of means 430-445, and components thereof, or processor 420 (in the case of apparatus 400 configured as a computing device) or the methods disclosed herein.

In yet further related aspects, the memory module 420 may optionally include executable code for the processor module 415 to: (a) receive a device identifier, user score, and content provider information; (b) categorize the content provider information as belonging to one or more categories of service; (c) retrieve from a database scores submitted by other content providers having identical digital fingerprint; and (d) generate a peer-group score based on the receive user score of step (a) and the retrieved scores of step (c). One or more of steps (a)-(d) may be performed by processor module 415 in lieu of or in conjunction with the means 430-445 described above.

It is noted that one or more of the techniques and methodologies described herein may be performed by embedded applications, platforms, or systems. The methods described herein may be performed by a general-purpose computer system and/or an embedded application or component of a special-purpose apparatus (e.g., traffic controller, traffic signal, surveillance cameras, sensors, detectors, vehicles, vehicle navigation systems, mobile phones, PDAs, etc.).

In one embodiment, the special-purpose device comprises an embedded platform running an embedded Linux operating system (OS) or the like. For example, the unique device identifier or fingerprint for the special-purpose device may be created by collecting and using one or more of the following information: machine model; processor model; processor details; processor speed; memory model; memory total; network model of each Ethernet interface; network MAC address of each Ethernet interface; BlackBox model (e.g. any Flash device); BlackBox serial (e.g. using Dallas Silicon Serial DS-2401 chipset or the like); OS install date; nonce value, nonce time of day; any other predefined hardware information stored (optionally encrypted in EEPROM; and any variations/combinations thereof.

While the present invention has been illustrated and described with particularity in terms of preferred embodiments, it should be understood that no limitation of the scope of the invention is intended thereby. Features of any of the foregoing methods and devices may be substituted or added into the others, as will be apparent to those of skill in the art. It should also be understood that variations of the particular embodiments described herein incorporating the principles of the present invention will occur to those of ordinary skill in the art and yet be within the scope of the invention.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

It is understood that the specific order or hierarchy of steps in the processes disclosed herein in an example of exemplary approaches. Based upon design preferences, it is understood that the specific order or hierarchy of steps in the processes may be rearranged while remaining within the scope of the present disclosure. The accompanying method claims present elements of the various steps in sample order, and are not meant to be limited to the specific order or hierarchy presented.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical discs (e.g., compact disc (CD), digital versatile disc (DVD), etc.), smart cards, and flash memory devices (e.g., Erasable Programmable Read Only Memory (EPROM), card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

What is claimed is:

1. A method for generating a peer-group score, comprising:
receiving at a computing system information including a device identifier, a user score associated with the device identifier, and content provider information from a content provider, the device identifier being based on at least one user-configurable parameter and at least one non-user-configurable parameter of a user device used to access network-accessible content of the content provider, wherein the at least one non-user-configurable parameter comprises a degradation measurement of processing speed over time of a computer chip of the user device;
categorizing the content provider as belonging to one or more classes of service based on the received information;
retrieving from a database one or more provider-generated user scores belonging to an identical one of the one or more classes of service and being associated with an identical device identifier; and
generating a peer-group score for the received device identifier based on the received user score and the one or more retrieved provider-generated user scores.

2. The method claim 1, wherein the user score is generated based on interactions between the user device and the network-accessible content of the content provider.

3. The method claim 1, wherein the one or more classes of services comprise a class selected from the list consisting of shopping, social networking, gaming, news, sports, and online video services.

4. The method claim 1, wherein the peer-group score is generated by averaging two or more of the received user score and the provider-rated user scores.

5. The method claim 1, wherein the at least one user-configurable parameter comprises one of hard disk volume name, user name, device name, user password, and hard disk initialization date for the user device.

6. The method claim 1, wherein the device identifier is generated by utilizing at least one irreversible transformation of the at least one user-configurable parameter and the at least one non-user-configurable parameter of the user device.

7. A non-transitory computer readable medium having stored thereon computer executable instructions that, when executed by a device, cause the device to perform a method comprising:
- receiving at server information including a device identifier, a user score associated with the device identifier, and content provider information from a content provider, the device identifier being based on at least one user-configurable parameter and at least one non-user-configurable parameter of a user device used to access network-accessible content of the content provider, wherein the at least one non-user-configurable parameter comprises a degradation measurement of processing speed over time of a computer chip of the user device;
- categorizing the content provider as belonging to one or more classes of service based on the received information;
- retrieving from a database one or more provider-generated user scores belonging to one or more of the classes of service and having an identical device identifier; and
- generating a peer-group score for the received device identifier based on the received user score and the one or more retrieved provider-generated user scores.

8. The computer readable medium of claim 7, wherein the user score is generated based on interactions between the user device and the network-accessible content of the content provider.

9. The computer readable medium of claim 7, wherein the classes of service comprise one or more classes selected from the list consisting of shopping, social networking, gaming, news, sports, and online video services.

10. The computer readable medium of claim 7, wherein the peer-group score is generated by averaging two or more of the received user score and the provider-rated user scores.

11. The computer readable medium of claim 7, wherein the at least one user-configurable parameter comprises one of hard disk volume name, user name, device name, user password, and hard disk initialization date for the user device.

12. The computer readable medium of claim 7, wherein the device identifier is generated by utilizing at least one irreversible transformation of the at least one user-configurable parameter and the at least one non-user-configurable parameter of the user device.

13. A system for generating a peer-group score, comprising:
- a server configured to receive information including a device identifier, a user score associated with the device identifier, and content provider information from a content provider, the device identifier being based on at least one user-configurable parameter and at least one non-user-configurable parameter of a user device used to access network-accessible content of the content provider, wherein the at least one non-user-configurable parameter comprises a degradation measurement of processing speed over time of a computer chip of the user device;
- a data analyzer coupled to the server, the data analyzer configured to categorize the content provider as belonging to one or more classes of service based on the received information;
- a database manager coupled to the server, the database manager configured to retrieve one or more provider-generated user scores belonging to one of the classes of service and having an identical device identifier; and
- a statistic engine coupled to the server, the statistic engine configured to generate a peer-group score for the received device identifier based on the received user score and the one or more retrieved provider-generated user scores.

14. The system of claim 13, wherein the user score is generated based on interactions between the user device and the network-accessible content of the content provider.

15. The system of claim 13, wherein the classes of service comprise one or more classes selected from the list consisting of shopping, social networking, gaming, news, sports, and online video services.

16. The system of claim 13, wherein the peer-group score is generated by averaging two or more of the received user score and the provider-rated user scores.

17. The system of claim 13, wherein the at least one user-configurable parameter comprises one of hard disk volume name, user name, device name, user password, and hard disk initialization date for the user device.

* * * * *